United States Patent
Zhang

(10) Patent No.: US 10,893,203 B2
(45) Date of Patent: Jan. 12, 2021

(54) PHOTOGRAPHING METHOD AND APPARATUS, AND TERMINAL DEVICE

(71) Applicant: Huawei Technologies Co., Ltd., Shenzhen (CN)

(72) Inventor: Yuxi Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 42 days.

(21) Appl. No.: 16/465,416

(22) PCT Filed: Apr. 13, 2017

(86) PCT No.: PCT/CN2017/080451
§ 371 (c)(1),
(2) Date: May 30, 2019

(87) PCT Pub. No.: WO2018/098968
PCT Pub. Date: Jun. 7, 2018

(65) Prior Publication Data
US 2020/0014861 A1     Jan. 9, 2020

(30) Foreign Application Priority Data
Nov. 30, 2016 (CN) .......................... 2016 1 1090844

(51) Int. Cl.
*H04N 5/232*  (2006.01)
*H04N 5/225*  (2006.01)
*G06F 40/58*  (2020.01)

(52) U.S. Cl.
CPC ....... *H04N 5/232939* (2018.08); *G06F 40/58* (2020.01); *H04N 5/22525* (2018.08); *H04N 5/23218* (2018.08)

(58) Field of Classification Search
CPC ................................. H04N 5/232939
(Continued)

(56) References Cited

U.S. PATENT DOCUMENTS

| 4,835,563 A | * | 5/1989 | Larish ................. G03B 15/06 |
| | | | 348/E7.085 |
| 9,344,673 B1 | | 5/2016 | Buchheit et al. |

(Continued)

FOREIGN PATENT DOCUMENTS

| CN | 1487445 A | 4/2004 |
| CN | 101383900 A | 3/2009 |

(Continued)

OTHER PUBLICATIONS

Machine Translation and Abstract of Chinese Publication No. CN103530366, Jan. 22, 2014, 24 pages.

(Continued)

*Primary Examiner* — Joel W Fosselman
(74) *Attorney, Agent, or Firm* — Conley Rose, P.C.

(57) ABSTRACT

A terminal device obtains a first instruction triggering a photographing function, presents a viewfinder window on a first screen, obtains a feature parameter of a target image, where the target image is an image presented in the viewfinder window, presents preset playing content on a second screen when the feature parameter of the target image matches a standard feature parameter, and performs a photographing operation. Therefore, after the photographing function is enabled, the viewfinder window is presented, and the preset playing content is played on the second screen, where the playing content may attract attention of a photographed target such that the photographed target is stimulated in a short time to show a vivid expression.

17 Claims, 9 Drawing Sheets

(58) Field of Classification Search
USPC .................................................. 348/333.02
See application file for complete search history.

(56) References Cited

U.S. PATENT DOCUMENTS

| | | | | |
|---|---|---|---|---|
| 10,094,655 | B2* | 10/2018 | Sabitov | .............. G06K 9/00288 |
| 2003/0142216 | A1 | 7/2003 | Jelinek | |
| 2007/0179773 | A1 | 8/2007 | Shibutani | |
| 2009/0066835 | A1 | 3/2009 | Chen | |
| 2015/0254044 | A1 | 9/2015 | Cho et al. | |

FOREIGN PATENT DOCUMENTS

| | | | |
|---|---|---|---|
| CN | 102055896 | A | 5/2011 |
| CN | 103530366 | A | 1/2014 |
| CN | 103631333 | A | 3/2014 |
| CN | 104125396 | A | 10/2014 |
| CN | 105407285 | A | 3/2016 |
| CN | 105681662 | A | 6/2016 |
| CN | 106027899 | A | 10/2016 |
| GB | 2447976 | A | 10/2008 |
| WO | 2006056655 | A1 | 6/2006 |

OTHER PUBLICATIONS

Machine Translation and Abstract of Chinese Publication No. CN10363133, Mar. 12, 2014, 15 pages.

Foreign Communication From a Counterpart Application, Chinese Application No. 201780073611.0, Chinese Office Action dated Dec. 18, 2019, 9 pages.

Foreign Communication From a Counterpart Application, European Application No. 17876461.9, Extended European Search Report dated Oct. 9, 2019, 8 pages.

Machine Translation and Abstract of Chinese Publication No. CN102055896, May 11, 2011, 12 pages.

Machine Translation and Abstract of Chinese Publication No. CN104125396, Oct. 29, 2014, 32 pages.

Machine Translation and Abstract of Chinese Publication No. CN105407285, Mar. 16, 2016, 32 pages.

Machine Translation and Abstract of Chinese Publication No. CN105681662, Jun. 15, 2016, 24 pages.

Machine Translation and Abstract of Chinese Publication No. CN106027899, Oct. 12, 2016, 10 pages.

"YotaPhone 2 review: The 5-inch dual-screen handset is back, and this time it makes sense," Retrieved from website: https://thenextweb.com/plugged/2014/12/03/yotaphone-2-review-5-inch-dual-screen-handset-back-time-makes-sense/, dated Dec. 3, 2014, 17 pages.

Foreign Communication From a Counterpart Application, PCT Application No. PCT/CN2017/080451, English Translation of International Search Report dated Aug. 21, 2017, 2 pages.

Foreign Communication From a Counterpart Application, PCT Application No. PCT/CN2017/080451, English Translation of Written Opinion dated Aug. 21, 2017, 6 pages.

* cited by examiner

PHOTOGRAPHING METHOD AND APPARATUS, AND TERMINAL DEVICE

CROSS-REFERENCE TO RELATED APPLICATIONS

This application is a U.S. National Stage of International Patent Application No. PCT/CN2017/080451 filed on Apr. 13, 2017, which claims priority to Chinese Patent Application No. 20161100844.5 filed on Nov. 30, 2016. Both of the aforementioned applications are hereby incorporated by reference in their entireties.

TECHNICAL FIELD

This application relates to the field of mobile terminal technologies, and more specifically, to a photographing technology.

BACKGROUND

An existing terminal device (for example, a digital camera and an intelligent terminal) is equipped with a display screen. When photographing is performed, the display screen may be configured to present a viewfinder window. A photographer may see, through the viewfinder window, an image captured by a camera lens.

When photographing is performed by using the existing terminal device, a vivid and excellent expression is not easily snapped. For example, when photographing a child, the photographer often needs to wait a long time for the photographed target to show a rich and vivid expression. Sometimes, when the photographed target has a rich and vivid expression, an excellent moment cannot be snapped due to other reasons, for example, the photographer misses the moment due to other events, or the device automatically enters a screen-off state due to a long standby time.

SUMMARY

In view of this, embodiments of this application provide a photographing method and apparatus, and a terminal device, to resolve a technical problem of low photographing efficiency and poor user experience due to difficulty in obtaining a vivid and excellent expression and incapability of snapping an excellent moment.

To achieve the foregoing objective, the embodiments of this application provide the following technical solutions.

According to a first aspect, an embodiment of this application provides a photographing method. The method is applied to a terminal device, and the terminal device includes a first screen unit and a second screen unit. The method includes: obtaining a first instruction that is used to trigger a photographing function of the terminal device; presenting a viewfinder window on the first screen unit in response to the first instruction; obtaining a feature parameter of a target image, where the target image is an image presented in the viewfinder window; if the feature parameter of the target image matches a standard feature parameter, presenting preset playing content (for example, at least one of a text, an image, audio, and a video) on the second screen unit; and performing a photographing operation. The standard feature parameter may be used to determine whether the feature parameter of the target image meets an expected objective. The standard feature parameter may include a default standard feature parameter (for example, a type of a photographed target: a human or an animal) and a user-defined standard feature parameter (determining whether a photographed target is a specific person, for example, determining, based on facial recognition, whether a photographed target is a wife or a child of a user). In addition to being applied to a photographing scenario, the foregoing method may be further applied to a video photographing preview phase or a video recording process. In comparison with the prior art, in the solution provided in this application, after the photographing function is enabled, the second screen unit of the terminal device is configured to play the preset playing content. The playing content may attract attention of a photographed target, and amuse or stimulate the photographed target. Therefore, the photographed target can be stimulated in a short time to show a vivid expression, and a photographer can snap an excellent moment without waiting for a long time, to improve photographing efficiency and improve user experience of the photographer and the photographed target.

In a possible design, the standard feature parameter may include a default standard feature parameter, and the default standard feature parameter is a default value that is of each feature of the photographed target and that is provided by the terminal device. The default standard feature parameter is usually not used to detect or recognize a specific person or animal. The default standard feature parameter may include, for example, a standard front feature parameter used to determine whether the photographed target directly faces a lens or directly stares at a lens, a standard texture feature parameter used to distinguish between a human and an animal, a standard hair feature parameter, a standard age feature parameter of each age group, a standard age feature parameter of a specific age group, and a standard gender feature parameter. In an example, before the presenting a viewfinder window on the first screen unit, the method may further include: setting playing content associated with the default standard feature parameter. The default standard feature parameter may be used to: determine whether the photographed target directly faces the lens or directly stares at the lens, determine whether the photographed target is a human or an animal, determine an age group for the photographed target, determine whether an age of the photographed target is at a specific age group, determine a gender of the photographed target, and the like. Therefore, this design may be applied to, for example, the following specific application scenario: When determining that a person in the viewfinder window directly faces the lens or directly stares at the lens, the terminal plays corresponding text content or dynamic content (audio and video) on the second screen unit that faces the person. If it is recognized that a child smaller than three years old directly faces the lens or directly stares at the lens, the second screen unit can automatically play an interesting cartoon video to amuse the child. If it is recognized that the child smaller than three years old does not directly face the lens, the second screen unit may play a sound first to attract attention of the child; and after it is recognized that the child stares at the lens, play a video that can amuse the child, to enable the photographed target to show a vivid expression, so that an excellent image can be captured. When determining that the person in the viewfinder window directly faces the lens (or an eye stares at the lens) and determining a gender of the person, the terminal device plays, on the second screen unit that faces the person, a photographing pose guide image associated with the gender, and the photographed target may pose a corresponding posture based on the photographing pose guide image. In this way, a set of default feature parameters and corresponding videos are set. Therefore, when photographing any person (for example, a stranger), the terminal device can effectively attract attention of the photographed target, and snap the photographed target, to improve photographing efficiency and improve photographing experience of the photographed target.

In a possible design, the standard feature parameter may include a user-defined standard feature parameter. The user-defined standard feature parameter is some feature parameters set by the user, for example, whether a photographed target is a specific person (for example, determining, based on facial recognition, whether a photographed target is a wife or a child of the user), a degree of intimacy with a specific person (for example, a degree of intimacy with the user), frequency of contacting with the user of the terminal device, and whether a photographed target meets some facial features (for example, a round face) customized by the user. In addition, playing content associated with the user-defined standard feature parameter may be set for the user-defined standard feature parameter. The user-defined standard feature parameter may be used to recognize a specific person or object. Therefore, this design may be applied to, for example, the following specific application scenario: photographing a specific person or object, for example, photographing lovers. A plurality of images of a girlfriend in the terminal device may be specified, and the terminal device extracts a first feature parameter from the plurality of specified images and uses the first feature parameter as the user-defined standard feature parameter. In this way, when photographing the girlfriend, once the terminal device recognizes that the girlfriend directly faces the lens or directly stares at the lens, the terminal device randomly and automatically plays various set content that makes the girlfriend happy, to snap an excellent moment of the girlfriend and implement personalized photographing. Further, for setting of the user-defined standard feature parameter, a feature parameter of a specified image in an album may be extracted and used as the user-defined standard feature parameter; a feature parameter of at least one contact profile picture of a specified contact may be extracted and used as the user-defined standard feature parameter; or an instruction for entering at least one feature parameter by the user may be obtained to determine a corresponding feature parameter. Due to such diversified settings, the user can conveniently perform personalized setting for a specific user, and effectively amuse or attract a specific target, to improve photographing efficiency.

In the foregoing possible designs, the playing content includes at least one of a text, an image, audio, and a video. Further, to facilitate communication in a plurality of language domains, language conversion may also be performed. Specifically, if the text in the playing content uses a first language, for example, Chinese. and a language associated with a current geographic location is a second language: English that is inconsistent with the language used in the playing content, the text in the playing content may be translated into a text using the second language, to be specific, Chinese is translated into English, and playing content using the second language is presented on the second screen unit. In this way, an application scope and an application scenario of the terminal device may be extended, for example, facilitating photographing of tourists from different countries during traveling.

In a possible design, when the terminal device includes a plurality of camera lenses, a plurality of viewfinder windows may be presented on the first screen unit, and different viewfinder windows present images captured by different camera lenses. In this way, images captured by different camera lenses may be simultaneously presented. For example, if a parent photographs two children of the parent, two second screen units may face the two children respectively, and the parent faces the first screen unit. In this way, the first screen unit may present two viewfinder windows, and each viewfinder window presents an image of one child. In addition, a size of a viewfinder window and a display location may also be adjusted. For example, a size of one of the viewfinder windows may be enlarged, and a size of the other viewfinder window may be reduced. Alternatively, images captured by a plurality of camera lenses may be combined into one image, and the image is presented in one viewfinder window. After the terminal device performs the photographing operation, the composite image is stored in the terminal device. In this way, diversified selection is implemented for multi-screen multi-camera lens photographing, to provide better experience for the user.

According to a second aspect, an embodiment of this application provides a photographing apparatus including a first screen unit and a second screen unit. The photographing apparatus further includes: a first obtaining unit, configured to obtain a first instruction that is used to trigger a photographing function of the terminal device; the first screen unit, configured to present a viewfinder window in response to the first instruction; a second obtaining unit, configured to obtain a feature parameter of a target image, where the target image is an image presented in the viewfinder window; the second screen unit, configured to: if the feature parameter of the target image matches a standard feature parameter, present preset playing content; and a photographing unit, configured to perform a photographing operation. In this way, photographing efficiency is improved, and user experience of a photographer and a photographed target is improved.

Further, the photographing apparatus may be further configured to perform the method steps in the first aspect, and details are not described herein again.

According to a third aspect, an embodiment of this application provides a terminal device, including a processor, a memory, a camera lens, an input device, a first screen unit, a second screen unit, and a bus. The processor, the memory, the camera lens, the input device, the first screen unit, and the second screen unit are connected by using the bus. The memory is configured to store an instruction. The input device obtains a first instruction used to trigger a photographing function of the terminal device. The processor is configured to present a viewfinder window on the first screen unit in response to the first instruction. The processor is further configured to: obtain a feature parameter of a target image, where the target image is an image presented in the viewfinder window; and if the feature parameter of the target image matches a standard feature parameter, present preset playing content on the second screen unit. The camera lens is configured to perform a photographing operation. In this way, photographing efficiency is improved, and user experience of a photographer and a photographed target is improved.

Further, the terminal device may be further configured to perform the method steps in the foregoing first aspect, and the terminal device has a function of implementing a behavior of the terminal device in the foregoing method designs. The function may be implemented by using hardware, or may be implemented by executing corresponding software by hardware. Details are not described herein.

According to a fourth aspect, this application provides a computer readable storage medium, and the computer readable storage medium stores an instruction. When the instruction is run on a computer, the computer performs the methods in the foregoing aspects.

According to a fifth aspect, this application provides a computer program product that includes an instruction. When the computer program product is run on a computer, the computer performs the methods in the foregoing aspects.

In comparison with the prior art, in the solution provided in this application, after the photographing function is enabled, the first screen unit of the terminal device presents the viewfinder window. In addition, if the feature parameter of the target image matches the standard feature parameter, the second screen unit of the terminal device is configured to play the preset playing content. The playing content may attract attention of the photographed target, and amuse or stimulate the photographed target. Therefore, the photographed target can be stimulated in a short time to show a vivid expression, and the photographer can snap an excellent moment without waiting for a long time, to improve photographing efficiency and improve user experience of the photographer and the photographed target.

DESCRIPTION OF EMBODIMENTS

Embodiments of this application provide a photographing method and apparatus, and a terminal device. The photographing method is performed by the terminal device. The terminal device may be in various forms of user equipment (User Equipment, UE for short), a digital camera, a computer display, a television, a video recording device, and the like. The user equipment may include a smartphone, an iPod, or the like.

Figure 1:
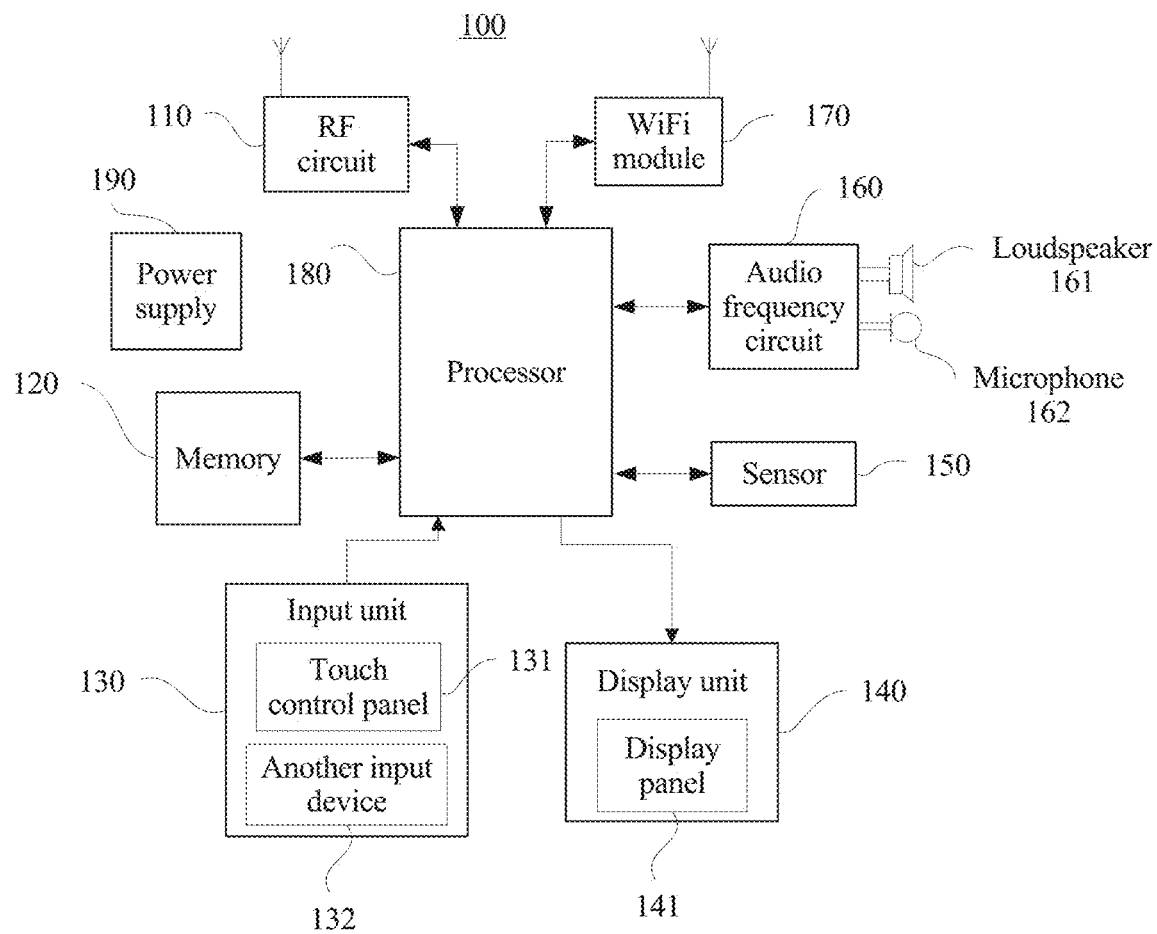
FIG. 1 is a schematic structural diagram of a terminal device according to an embodiment of the present invention.

As shown in FIG. 1. FIG. 1 is a schematic structural diagram of a terminal device according to an embodiment of the present invention. The terminal includes a processor, a memory, an input device, a display device, an operation component, and the like. The input device overlaps with the operation component. In some scenarios, the input device and the operation component may be a same electronic component, for example, a fingerprint sensor. In some scenarios, the input device and the operation component may be different electronic components. For example, the input device is a touchscreen, and the operation component is a gyro sensor.

Figure 4:
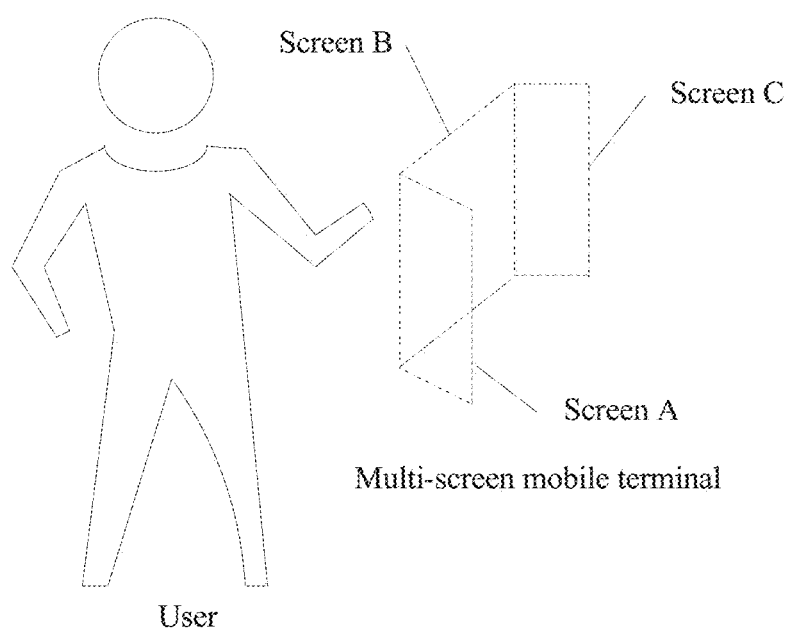
FIG. 4 is a schematic diagram of an application scenario of a multi-screen terminal device according to an embodiment of this application.

The present invention provides an embodiment of a mobile terminal, and a schematic structural diagram of the mobile terminal is shown in FIG. 1. It should be understood that a mobile terminal 100 shown in the figure is merely an example; and an actual product may have more or fewer parts than those shown in FIG. 1, may combine two or more parts, or may have different part configurations. The mobile terminal shown in the figure may be configured to perform the method shown in FIG. 4, FIG. 6, or FIG. 7. The parts shown in FIG. 1 may be implemented in hardware that includes one or more signal processors and/or application-specific integrated circuits, in software, or in a combination of hardware and software. As shown in the figure, the mobile terminal 100 includes parts such as an RF (Radio Frequency, radio frequency) circuit 110, a memory 120, an input unit 130, a display unit 140, a sensor 150, an audio frequency circuit 160, a WiFi (wireless fidelity, Wireless Fidelity) module 170, a processor 180, and a power supply 190. The following describes each composition part in detail.

The RF circuit 110 may be configured to: receive and send a signal in an information receiving or sending process or in a call process: particularly, after receiving downlink information of a base station, send the downlink information to the processor 180 for processing; and send designed uplink data to the base station. Generally, the RF circuit includes but is not limited to an antenna, at least one amplifier, a transceiver, a coupler, an LNA (Low Noise Amplifier, low noise amplifier), a duplexer, and the like. In addition, the RF circuit 110 may further communicate with a network and another device through wireless communication. The wireless communication may use any communications standard or protocol, including but not limited to: GSM (Global System of Mobile communication. Global System for Mobile Communications), a GPRS (General Packet Radio Service, general packet radio service), CDMA (Code Division Multiple Access. Code Division Multiple Access), WCDMA (Wideband Code Division Multiple Access, Wideband Code Division Multiple Access), LTE (Long Term Evolution, Long Term Evolution), an email, an SMS (Short Messaging Service, short message service), or the like.

The memory 120 may be configured to store a software program and a module. The processor 180 performs data processing and various function applications of the mobile terminal 100 by running the software program and the module stored in the memory 120. The memory 120 may mainly include a program storage area and a data storage area. The program storage area may store an operating system, an application program required by at least one function (for example, a sound playing function or an image playing function), and the like. The data storage area may store data (for example, audio data or a phone book) created based on use of the mobile terminal 100, and the like. In addition, the memory 120 may include a high-speed random access memory, or may include a nonvolatile memory, for example, at least one magnetic disk storage component, a flash memory component, or another volatile solid-state storage component.

The input unit 130 may be configured to: receive input number or character information, and generate key signal input related to user setting and function control of the mobile terminal 100. Specifically, the input unit 130 may include a touch control panel 131 and another input device 132. The touch control panel 131 is also referred to as a touchscreen, and may collect a touch operation (for example, an operation performed by a user on the touch control panel 131 or near the touch control panel 131 by using any proper object or accessory such as a finger or a stylus) of the user on or near the touch control panel 131, and drive a corresponding connection apparatus based on a preset program. Optionally, the touch control panel 131 may include two parts: a touch detection apparatus and a touch controller. The touch detection apparatus detects a touch location of the user, detects a signal brought by the touch operation, and transmits the signal to the touch controller. The touch controller receives touch information from the touch detection apparatus, converts the touch information into coordinates of a touch point, and sends the coordinates to the processor 180, and can receive and execute a command sent by the processor 180. In addition, the touch control panel 131 may be implemented by using a plurality of types such as a resistive type, a capacitive type, an infrared ray, and a surface acoustic wave. The input unit 130 may further include the another input device 132 in addition to the touch control panel 131. Specifically, the another input device 132 may include but is not limited to one or more of a physical keyboard, a function key (such as a volume control key or an on/off key), a trackball, a mouse, a joystick, and the like.

The display unit 140 may be configured to display information entered by the user or information provided for the user, and various menus of the mobile terminal 100. The display unit 140 may include a display panel 141. Optionally, the display panel 141 may be configured in forms of an LCD (Liquid Crystal Display, liquid crystal display), an OLED (Organic Light-Emitting Diode, organic light-emitting diode), and the like. Further, the touch control panel 131 may cover the display panel 141. When detecting the touch operation on or near the touch control panel 131, the touch control panel 131 transfers the touch operation to the processor 180 to determine a type of a touch event, and then the processor 180 provides corresponding visual output on the display panel 141 based on the type of the touch event. In FIG. 1, the touch control panel 131 and the display panel 141 are used as two independent parts to implement input and input functions of the mobile terminal 100. However, in some embodiments, the touch control panel 131 and the display panel 141 may be integrated to implement the input and output functions of the mobile terminal 100.

The mobile terminal 100 may further include at least one sensor 150 such as a fingerprint sensor, a light sensor, a motion sensor, or another sensor. Specifically, the fingerprint sensor is configured to recognize fingerprint information entered by the user. The light sensor may include an ambient light sensor and a proximity sensor. The ambient light sensor may adjust luminance of the display panel 141 based on brightness of ambient light, and the proximity sensor may turn off the display panel 141 and/or backlight when the mobile terminal 100 approaches an ear. As a motion sensor, an accelerometer sensor may detect an acceleration value in each direction (usually, in three axes), and detect a value and a direction of gravity when the accelerometer sensor is static, and may be applied to an application to recognize a mobile terminal posture (such as screen switching between landscape and profile picture modes, a related game, or magnetometer posture calibration), a function related to vibration recognition (such as a pedometer or a knock), and the like. Other sensors such as a gyroscope, a barometer, a hygrometer, a thermometer, and an infrared sensor may be further configured on the mobile terminal 100. Details are not described herein.

The audio frequency circuit 160, a loudspeaker 161, and a microphone 162 may provide an audio interface between the user and the mobile terminal 100. The audio frequency circuit 160 may transmit, to the loudspeaker 161, a received electrical signal obtained after audio data conversion, and the loudspeaker 161 converts the electrical signal into a sound signal for output. In addition, the microphone 162 converts a collected sound signal into an electrical signal; and the audio frequency circuit 160 receives the electrical signal, then converts the electrical signal into audio data, and outputs the audio data to the RF circuit 108, to send the audio data to, for example, another mobile terminal, or outputs the audio data to the memory 120 for further processing.

WiFi belongs to a short-range wireless transmission technology. The mobile terminal 100 may use the WiFi module 170 to help the user receive and send emails, browse a web page, access streaming media, and the like. The WiFi module 170 provides the user with wireless broadband Internet access. FIG. 1 shows the WiFi module 170. However, it may be understood that the WiFi module 170 is not a mandatory component of the mobile terminal 100, and may be totally omitted based on a requirement without changing the essence of the present invention.

The processor 180 is a control center of the mobile terminal 100, and is connected to each part of the entire mobile terminal by using various interfaces and lines. The processor 180 performs data processing and various functions of the mobile terminal 100 by running or executing the software program and/or the module stored in the memory 120 and invoking data stored in the memory 120, to perform overall monitoring on the mobile terminal. Optionally, the processor 180 may include one or more processing units. Preferably, an application processor and a modem processor may be integrated into the processor 180. The application processor mainly processes an operating system, a user interface, an application program, and the like. The modem processor mainly processes wireless communication. It may be understood that the modem processor may alternatively be not integrated into the processor 180.

The mobile terminal 100 further includes the power supply 190 (for example, a battery) that supplies power to each part. Preferably, the power supply may be logically connected to the processor 180 by using a power management system, to manage functions such as charging, discharging, and power consumption by using the power management system.

Although not shown in the figure, the mobile terminal 100 may further include a camera lens, a Bluetooth module, and the like. Details are not described herein.

The processor 180 performs the program stored in the memory 120, and invokes another device. The processor 180 may be configured to implement the photographing method provided in the embodiments shown in FIG. 5 to FIG. 7.

Figure 2:
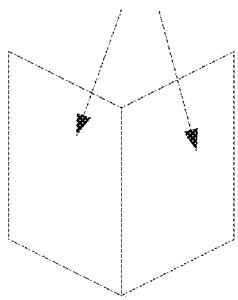
FIG. 2 is a schematic diagram of a folding screen according to an embodiment of this application.
Figure 3:
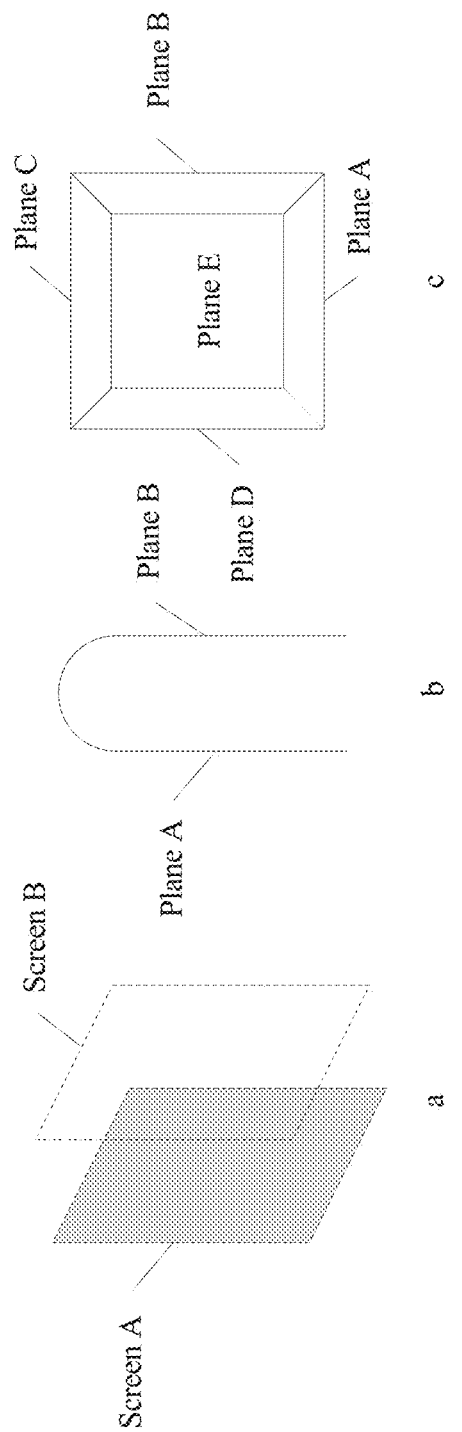
FIG. 3 is a schematic diagram of a plurality of screens of a terminal device according to an embodiment of this application.

A development trend of the terminal device is that screens are disposed on both sides (each screen is a screen unit). Alternatively, referring to FIG. 2, an ink screen, a flexible screen, and the like are applied to the terminal device, so that a screen on the terminal device can be bent or folded, forming a plurality of display areas (each display area is a screen unit). In other words, the terminal device may have a plurality of display areas. The plurality of display areas may be a plurality of display screens, to be specific, each display area is a display screen; or may be a plurality of display areas on one display screen, where the display screen is a foldable display screen. When the display screen is folded to be on different planes, each plane may be considered as a display area, and a plurality of display planes are respectively a plurality of display areas. Alternatively, referring to FIG. 3, a shows a dual-screen terminal device including a screen A and a screen B, where the screen A and the screen B are front and back screens of the terminal device; b shows a terminal device with a flexible screen, where the flexible screen can be bent at any angle, for example, the flexible screen is bent to form front and back screens: planes A and B; and c shows a multi-screen terminal device, where the terminal device includes five screens, planes A, B, C, and D are display screens in four directions, and a plane E is a separate display plane for the user to view related information. Alternatively, referring to FIG. 4, the terminal device having a plurality of screen units has three screen display areas: a screen A, a screen B, and a screen C. When the user uses the terminal device, the user may bend the screen A and the screen C, for example, bend the screen A and the screen C to make the screen A and the screen C on a same plane as the screen B; bend the screen A and the screen C to make the screen A and the screen C on a plane parallel to the screen B; or bend each of the screen A and the screen C to form any angle to the screen B. Any one of the foregoing screens/screen units may be configured to display an image and related information of the terminal device.

To be specific, the terminal device in this embodiment of this application may have a plurality of screen units, and the screen unit is equivalent to the display unit in FIG. 1. A screen unit is a physically independent screen, or a screen unit is a part of a bendable screen.

One of application scenarios of this embodiment of this application is as follows: In a process of photographing a person or an animal (which may be referred to as a photographed target), the terminal device uses a second screen unit (the second screen unit may face the photographed target) to play a text, an image, audio, a video, and the like, to attract attention of the photographed target and stimulate the photographed target to generate a more natural and vivid expression and action (for example, a smile or a loud laugh), to assist a photographer in snapping an excellent moment.

Figure 5:
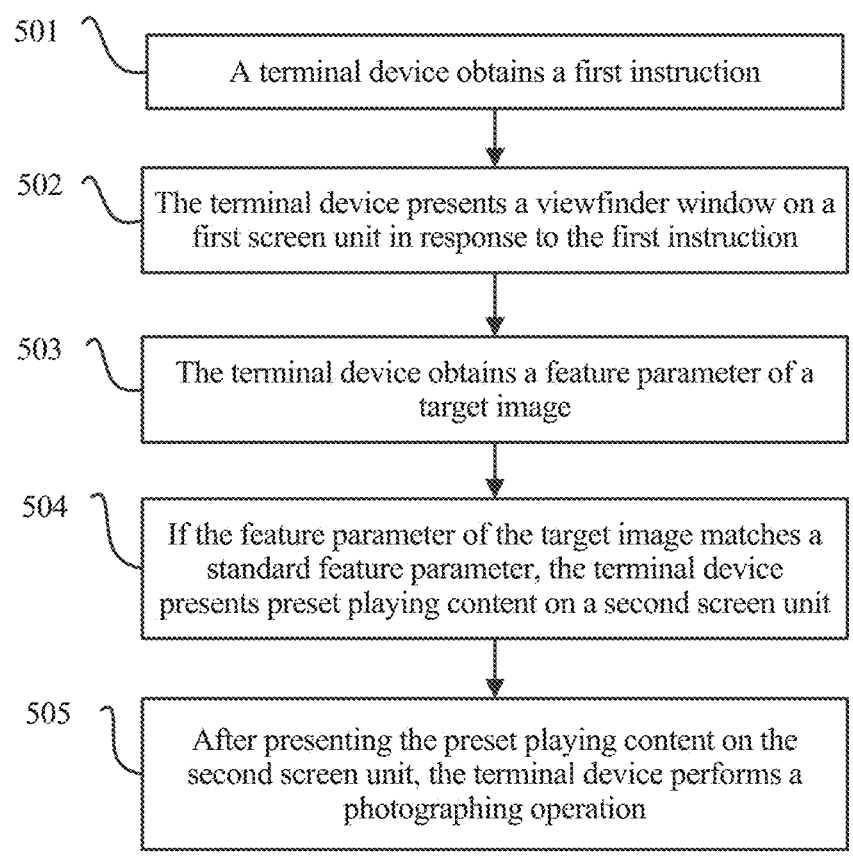
FIG. 5 is a schematic flowchart of a photographing method according to an embodiment of this application.

When the photographing method is applied in the foregoing application scenario, refer to FIG. 5 for an example process of the photographing method. The method includes the following steps.

501. A terminal device obtains a first instruction.

The first instruction is used to trigger a photographing function of the terminal device. In an example, a smartphone is used as an example. A photographer taps a "camera" icon on the smartphone, and delivers the first instruction.

502. The terminal device presents a viewfinder window on a first screen unit in response to the first instruction.

The foregoing example is still used. After the photographer taps the "camera" icon, the viewfinder window is presented on a screen unit that is of the smartphone and that faces the photographer, and the viewfinder window presents an image captured by a camera lens of the smartphone.

In an example, if the terminal device has two or more second screen units, and a camera lens is configured on a same side as each second screen unit, the camera lens on the same side as the second screen unit may capture an image in a photographing process.

Correspondingly, a plurality of viewfinder windows may be presented on the first screen unit, and different viewfinder windows present images captured by different camera lenses.

Figure 8A:
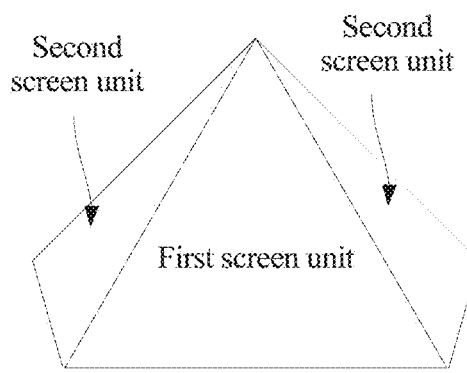
FIG. 8a is a schematic structural diagram of a first screen unit and a second screen unit according to an embodiment of this application.
Figure 8B:
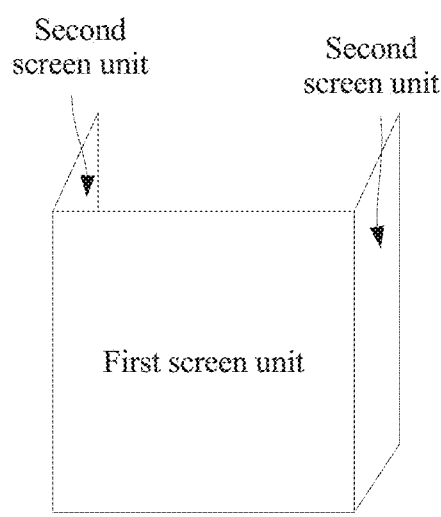
FIG. 8b is another schematic structural diagram of a first screen unit and a second screen unit according to an embodiment of this application.
Figure 8C:
FIG. 8c is a schematic diagram of an interface of a viewfinder window according to an embodiment of this application.

For example, referring to FIG. 8a and FIG. 8b, the terminal device has two second screen units and one first screen unit. If a parent photographs two children of the parent, the two second screen units may face the two children respectively, and the parent faces the first screen unit. In this way, the first screen unit may present two viewfinder windows, and each viewfinder window presents an image of one child. In addition, a size of a viewfinder window and a display location may also be adjusted. For example, a size of one of the viewfinder windows may be enlarged, and a size of the other viewfinder window may be reduced (referring to FIG. 8c).

Further, in another example, if a camera lens is also configured on a same side as the first screen unit, after the first instruction is delivered, the camera lens on the same side as the first screen unit may also capture an image (this is similar to self-photographing). The two second screen units and the first screen unit shown in FIG. 8a and FIG. 8b are still used as an example. It is assumed that the two second screen units face the two children respectively, and the parent faces the first screen unit. The first screen unit may present three viewfinder windows. One of the viewfinder windows presents an image of the parent, and the other two viewfinder windows present images of the two children.

Certainly, images captured by a plurality of camera lenses may also be combined into one image, and the image is presented in a viewfinder window. Alternatively, a plurality of viewfinder windows respectively present images captured by a plurality of camera lenses.

For ease of description in the following, an image presented in a viewfinder window may be referred to as a target image, for example, each frame of image presented in the viewfinder window is a target image.

503. The terminal device obtains a feature parameter of a target image.

Content of the feature parameter may also vary according to different objectives, different photographed targets, or different scenarios.

For example, if whether a photographed target directly faces a lens or directly stares at a lens needs to be determined in the following, the feature parameter may include, for example, a face area, a face feature part (for example, an ear, an eye, and a nose), and a face offset angle.

For another example, if whether a photographed target is a human or an animal needs to be determined, the feature parameter may include, for example, a texture feature parameter (used to represent a texture feature of a photographed target) and a hair feature parameter (used to represent a hair feature of a photographed target).

For another example, if whether the photographed target is a specific person or object needs to be determined, the feature parameter may include, for example, a local binary pattern (Local binary pattern, LBP) vector.

For another example, if the photographed target needs to be allocated to an age group, or whether an age of the photographed target is in a specific age group (for example, smaller than three years old) needs to be determined, the feature parameter may include, for example, an appearance feature parameter of an age group, for example, a wrinkle and pore roughness.

For another example, if a gender of the photographed target needs to be determined, the feature parameter may include, for example, a gender feature parameter, for example, whether the photographed target has a beard.

Certainly, a combination of the foregoing features may be obtained, for example, a texture feature parameter of the target image and an LBP feature parameter are separately obtained.

504. If the feature parameter of the target image matches a standard feature parameter, the terminal device presents preset playing content on the second screen unit.

A standard feature is a reference feature that meets an expected objective, and the standard feature parameter may be used to determine whether the feature parameter of the target image meets the expected objective. The standard feature parameter may include at least two parts: a default standard feature parameter and a user-defined standard feature parameter. The default standard feature parameter is a default value that is of each feature of the photographed target and that is provided by the terminal device. The default standard feature parameter is universal, for example, a type of the photographed target (a person or an animal), a gender of the photographed target, an age of the photographed target (an age group to which the photographed target belongs), a body feature of the photographed target (for example, a height or a body length, and fat or thin), and whether a face directly faces the camera lens. The user-defined standard feature parameter is some feature parameters set by the user, for example, whether the photographed target is a specific person (for example, determining, based on facial recognition, whether the photographed target is a wife or a child of the user), a degree of intimacy with a specific person (for example, a degree of intimacy with the user), a frequency of contact with the user of the terminal device, and whether the photographed target meets some facial features (for example, a round face) customized by the user.

For example, if the expected objective is to determine whether the photographed target directly faces the lens or directly stares at the lens, the standard feature parameter may include a feature parameter (which may be referred to as a standard front feature parameter for short) used to determine whether the photographed target directly faces the lens or directly stares at the lens.

For another example, if the expected objective is to determine whether the photographed target is a human or an animal, the standard feature parameter includes, for example, a standard texture feature parameter used to distinguish between a human and an animal, and a standard hair feature parameter.

For another example, if the expected objective is to determine whether the photographed target is a specific person or object, the standard feature parameter may include, for example, an LBP vector for the specific person or object.

For another example, if the expected objective is to determine an age group for the photographed target, the standard feature parameter may include, for example, an age feature parameter of each age group.

For another example, if the expected objective is to determine whether an age of the photographed target is in a specific age group (for example, smaller than three years old), the standard feature parameter may include, for example, a standard age feature parameter (which is referred to as a specific standard age feature parameter for short) of the specific age group.

For another example, if the expected objective is to determine a gender of the photographed target, the standard feature parameter may include, for example, a standard gender feature parameter.

This may be analogized. Details are not described herein.

Certainly, the standard feature parameter may be a combination of a plurality of feature parameters, for example, the standard feature parameter may include a standard texture feature parameter used to distinguish between a human and an animal, a standard age feature parameter of a specific age group, and the like.

The standard feature parameter may be a user-defined standard feature parameter that is specified by the user and that is obtained through learning, or may be a default standard parameter of a system. The default standard feature parameter is usually not used to detect or recognize a specific person or animal, in other words, cannot recognize an identity of the photographed target.

For example, the standard front feature parameter, the standard texture feature parameter used to distinguish between a human and an animal, the standard hair feature parameter, the standard age feature parameter of each age group, the standard age feature parameter of a specific age group, the standard gender feature parameter, and the like that are mentioned above may be used as the default standard feature parameter.

The LBP vector for a specific person or object may be used as the user-defined standard feature parameter.

Certainly, the user may also autonomously set the standard texture feature parameter, the standard hair feature parameter, the standard age feature parameter, the standard gender feature parameter, and the like.

The playing content may specifically include at least one of a text, an image, audio, and a video.

For an incoming call ringtone, the user may select, from system ringtones provided by the terminal, a ringtone for playing when a call comes in; or the user may customize a ringtone for playing when a call comes in.

The playing content in this embodiment is similar to setting of the incoming ringtone. The user may select, as the playing content, one or a combination of a text, an image, audio, and a video stored when the terminal device is delivered from a factory. Alternatively, the user may customize the playing content. For example, the user may store a text, an image, audio, a video, and the like in the terminal device through downloading or keyboard input, and select one or a combination of the text, the image, the audio, the video, and the like as the playing content.

More specifically, if the feature parameter of the target image matches the standard feature parameter, the second screen unit may be lighted to play the preset playing content.

When the second screen unit faces the photographed target, the photographed target may be attracted by the playing content played by the second screen unit, and generate a more natural and vivid expression and action (for example, a smile or a loud laugh), to assist the photographer in snapping an excellent moment.

In another embodiment of this application, if the feature parameter of the target image does not match the standard feature parameter, the second screen unit does not present the playing content, and the second screen unit remains in an initial state or a screen-off state. Alternatively, if the feature parameter of the target image does not match the standard parameter, the second screen unit presents common video content instead of video content corresponding to the standard parameter. The video content corresponding to the standard parameter may be understood as specific video content customized by the terminal device for a photographed target that meets the standard parameter, where the video content can amuse the photographed target that meets the standard parameter, for example, a Naroto video that is set for a son of the user. The common video content may be non-customized content that can usually make a person happy, for example, a funny video of Chaplin.

505. After presenting the preset playing content on the second screen unit, the terminal device performs a photographing operation.

In an example, after presenting the preset playing content, the terminal device may automatically perform the photographing operation, for example, automatically continual photographing or single photographing. Alternatively, after presenting the preset playing content for a period of time, the terminal device automatically performs a photographing action.

In another example, the terminal device may perform the photographing operation after obtaining a second instruction entered by the user. The second instruction is used to trigger the terminal device to perform the photographing operation. A smartphone is used as an example. The photographer taps a "camera" icon on the smartphone, and delivers the second instruction.

In a scenario in which a plurality of viewfinder windows are presented on the first screen unit, different viewfinder windows respectively present images captured by different camera lenses. That the terminal device performs a photographing operation may include a plurality of cases: In one case, when the user triggers a photographing action, the mobile phone combines, according to a preset rule or setting of the user, the images captured by the plurality of camera lenses, and combines, into one image, the images presented in the plurality of viewfinder windows. In a case, the user selects several viewfinder windows that the user likes, to trigger a photographing action, and the terminal device photographs only images captured by camera lenses corresponding to the several viewfinder windows. For example, if there are five camera lenses in total, the second screen unit presents five viewfinder windows, and the user selects two of the five viewfinder windows, when performing the photographing operation, the terminal device can photograph only images captured by camera lenses corresponding to the two viewfinder windows. Certainly, the terminal device may also photograph, in a one-tap manner, images captured by all the camera lenses, for example, capture images captured by the camera lenses corresponding to the five viewfinder windows. In a case, after the user triggers photographing of at least two camera lenses, a template may be provided for the user to place images that are from different angles of the photographed target and that are captured by different camera lenses, and the user may modify and beautify the images based on a requirement or a preference of the user.

In a scenario in which one viewfinder window is presented on the first screen unit, an image presented in the viewfinder window is a composite image of images captured by different camera lenses. The user may adjust a location that is of an image captured by any camera lens and that is in the viewfinder window, and the user may preview the composite image presented in the viewfinder window. A photographing button is pressed for photographing. The terminal device may drive all the camera lenses to photograph captured images, to generate a composite image presented in the viewfinder window. Certainly, the user may also trigger only some camera lenses, to generate a corresponding composite image.

It can be learned that, in this embodiment, after the photographing function is enabled, the viewfinder window is presented on the first screen unit of the terminal device; and if the feature parameter of the target image matches the standard feature parameter, the second screen unit of the terminal device is configured to play the preset playing content to attract attention of the photographed target. Therefore, the photographed target may be stimulated in a short time to generate a more natural and vivid expression and action (for example, a smile or a loud laugh), and the photographer does not need to wait for a long time, to assist the photographer in snapping an excellent moment before the device automatically enters a screen-off state, and improve photographing efficiency.

It should be noted that photographing is used as only an example in the foregoing description. Actually, the foregoing method may also be applied to video photographing, and steps 502 and 503 may be performed in a video photographing preview phase or in a video recording process.

The photographing method provided in this embodiment may implement that a second screen unit presents at least one of a text, an image, audio, and a video when it is determined that a photographed target directly faces a lens or directly stares at the lens. It should be noted that when the photographed target directly faces the lens, a front face of the photographed target is presented in a viewfinder window. Therefore, front face detection may be performed on a target image presented in the viewfinder window. If a front face is detected, it can be determined that the photographed target directly faces the lens. In preset duration, if a front face is detected at a plurality of frames of target images, it can be determined that the photographed target directly stares at the lens.

There are various front face detection manners. A human face is used as an example. A front face may be detected based on a cascading classifier. For example, the cascading classifier includes a Haar classifier or the like. A working principle of the cascading classifier is as follows: In a detection process, the cascading classifier determines whether there is a human face in a detection window (a rectangular window). For how to determine a rectangle window, refer to an existing manner. Certainly, there may be a new manner of determining a rectangle window in the future. Details are not described herein. Further, the cascading classifier includes a plurality of cascaded strong classifiers, and one strong classifier includes a plurality of weak classifiers based on a single feature.

The Haar classifier is used as an example. The weak classifier may be a basic Haar-like (Haar-like) feature. A Haar-like eigenvalue of the rectangular window may be calculated, and the Haar-like eigenvalue is compared with an eigenvalue of the weak classifier, to determine whether there is a human face in the rectangle window. For a manner of calculating a Haar-like eigenvalue, refer to an existing calculation manner. Certainly, there may be a new calculation manner to determine a Haar-like eigenvalue in the future. Details are not described herein. Alternatively, the front face may be detected based on a face offset angle. For example, an offset angle of a face in the target image is determined based on a preset correspondence between a feature part (for example, an ear or an eye) and an offset angle. Certainly, in an early stage, an ear in the image may be detected by using an ear classifier, and an eye may be detected by using an eye classifier, and so on. In addition, there are many other manners of detecting the front face. The manners are not enumerated herein one by one.

Figure 6:
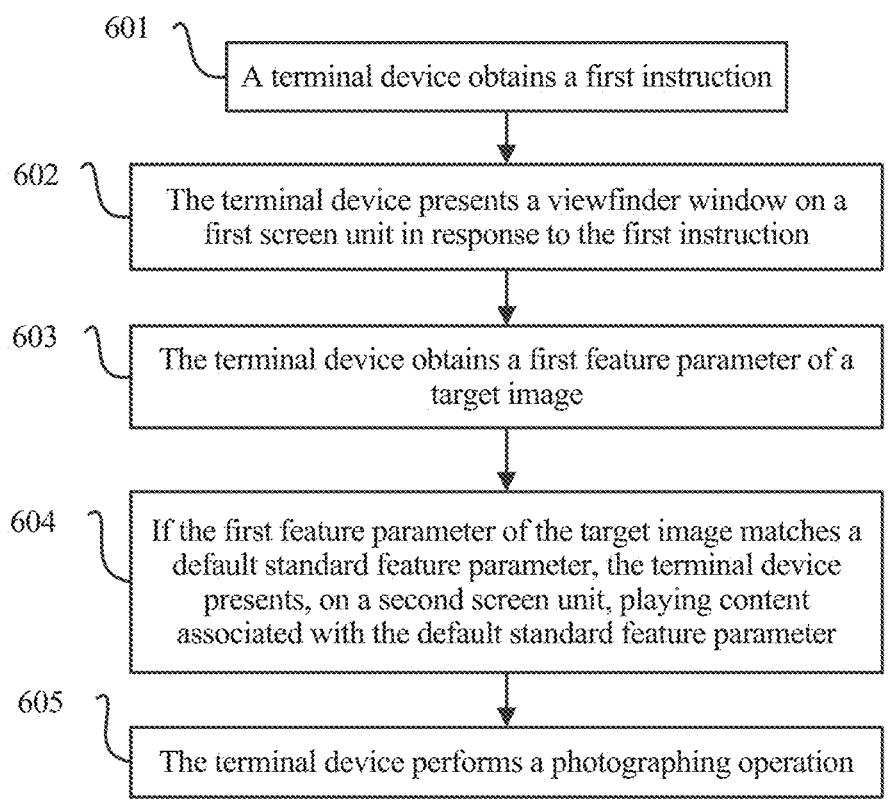
FIG. 6 is a schematic flowchart of a photographing method according to an embodiment of this application.

Specifically, FIG. 6 shows another schematic process of the foregoing photographing method. The method includes the following steps.

Steps 601 and 602 are respectively the same as steps 501 and 502 in the foregoing embodiment shown in FIG. 5, and details are not described herein again.

603. A terminal device obtains a first feature parameter of a target image.

In an example, if front face detection is performed by using the above mentioned cascading classifier, the first feature parameter may include, for example, an eigenvalue of a rectangular window. For example, for a Haar classifier, the first feature parameter may include a Haar-like eigenvalue of the rectangle window. In another example, if front face detection is performed based on a face offset angle, the first feature parameter may include, for example, an offset angle of a face in the target image.

604. If the first feature parameter of the target image matches a default standard feature parameter, the terminal device presents, on a second screen unit, playing content associated with the default standard feature parameter.

In other words, the above mentioned standard feature parameter may include the default standard feature parameter. Specific content of the default standard feature parameter varies according to detection manners. For example, in a manner of detecting a front face by using the cascading classifier, the default standard feature parameter includes an eigenvalue corresponding to a weak classifier. For another example, if the front face is detected based on the face offset angle, the default standard feature parameter may include, for example, an offset angle threshold. When the face offset angle is greater than the offset angle threshold, it may be determined that the front face is not detected.

In this embodiment, for description of the playing content, refer to the foregoing parts. Details are not described herein again.

It should be noted that there may be one group or a combination of a plurality of groups of default standard feature parameters. For example, a first group of default standard feature parameters includes a front or a profile of a face, and is used to, for example, detect whether a front face is photographed; a second group of default standard feature parameters includes a type of a photographed target, and is used to, for example, detect whether the photographed target is a pet (for example, a dog or a cat); a third group of default standard feature parameters includes the foregoing specific standard age feature parameter, and may be used to detect, for example, whether the photographed target is a child smaller than three years old; a fourth group of default standard feature parameters includes the foregoing gender standard feature parameter, and may be used to recognize, for example, a gender of the photographed target; and so on. Details are not described. Standard feature parameters in different groups may be associated with different or same playing content. When the standard feature parameters are associated with different playing content, it may be considered that playing content is customized for a photographed target of a specific type. Therefore, an expression and attention of the photographed target can be specifically mobilized, to improve photographing efficiency.

Therefore, in another embodiment of this application, before the viewfinder window is presented, step "setting the playing content associated with the default standard feature parameter" may be further included. For the setting, refer to the foregoing description in step 504. Details are not described herein again.

605. The terminal device performs a photographing operation. Refer to the description in step 505 in the foregoing embodiment shown in FIG. 5. Details are not described herein again.

It can be learned that, in this embodiment, after a photographing function is enabled, a viewfinder winder is presented on a first screen unit of the terminal device; and if the first feature parameter of the target image matches the default standard feature parameter, the second screen unit of the terminal device is configured to play the preset playing content. Therefore, a more detailed solution for how to use a screen unit during photographing is provided.

A more specific application scenario is used as an example below to describe the photographing method provided in this application in detail.

In a specific application scenario 1, photograph a nonspecific person.

When it is determined that a person in the viewfinder window directly faces the lens or an eye directly stares at the lens, the terminal plays corresponding text content or dynamic content (audio and video) on the second screen unit that faces the person. In an example, the first group of default standard feature parameters may be used to detect a front face. If the first feature parameter of the target image matches the first group of default standard feature parameters (to be specific, it is determined that the person in the viewfinder window directly faces the lens or the eye directly stares at the lens), the terminal device plays the foregoing text content or dynamic content on the second screen unit that faces the person.

More specifically, the foregoing text content or dynamic content may mainly focus on expressing gratitude and praise.

For example, when a person travels to a place and photographs a stranger that also travels, if it is recognized that the counterpart directly faces the lens or directly stares at the lens, the second screen unit automatically plays the text content or dynamic content about gratitude and praise, and the counterpart laughs more naturally, to assist the photographer in capturing an excellent moment.

It is considered that the photographer may travel abroad. For example, the photographer lives in the UK, and the photographer travels to France, Germany, and the like. Therefore, a language used in the playing content may be different from a language used in a traveling place. In this case, the text may be translated into a locally used language, and then presented on the second screen unit.

To be specific, if the text in the playing content uses a first language, the following steps may be performed to implement "presenting the preset playing content on the second screen unit":

Step A: Determine a second language associated with a current geographic location.

In an example, a user of the terminal device may select the second language associated with the current geographic location. For example, the terminal device may provide a plurality of language options, and the user may select one of the options to set the second language associated with the current geographic location.

In another example, the terminal device may learn, by connecting to a network, the second language associated with the current geographic location, for example, the mobile phone detects that current GPS information is GPS information of Paris of France, and determines that the second language is French.

Step B: If the second language is inconsistent with the first language, translate the text in the playing content into a text using the second language, and present the text using the second language on the second screen unit.

For example, if the first language is Chinese, and the second language is French, Chinese in the playing content is translated into French, and the playing content using French is presented on the second screen unit.

Similarly, similar processing may be performed on an audio file. If the audio file is pronounced in the first language (for example, Chinese), and the second language (for example, French) associated with the current geographic location is inconsistent with the first language, the audio file pronounced in the first language may be convened into an audio file pronounced in the second language, and the audio file pronounced in the second language is played.

Alternatively, the terminal device may store, in advance, playing content written or pronounced in the second language. When a language associated with a current geographic location is the second language, the playing content written or pronounced in the second language may be automatically played. In other words, a group of standard feature parameters may be associated with playing content of a plurality of "language versions".

Further, if the terminal device does not have a translation capability, if it is determined, based on the current geographic location, that a language in the current geographic location is inconsistent with a language supported by the terminal device, preset universal playing content that can make a person happy is presented, for example, the piano music of Beethoven.

In a specific application scenario 2, photograph a child, for example, photograph a child smaller than three years old.

When an adult photographs a child smaller than three years old, if it is recognized that the photographed target is a child smaller than three years old or if it is recognized that the child smaller than three years old directly faces the lens or directly stares at the lens, the second screen unit can automatically play an interesting cartoon video, and can create sound effects at the same time to attract attention of the child, to amuse the child to show a vivid expression, so as to capture an excellent image.

Alternatively, when a child smaller than three years old is photographed, if it is determined, based on a face feature parameter captured by the camera lens, that the photographed target is strongly associated with the user of the terminal device (for example, the terminal device stores a large quantity of images of the photographed target, or stores a large quantity of videos of the photographed target), the terminal device may play playing content customized for the photographed target, for example, an animation that the child likes, or a video of the child that is stored in the device.

The terminal plays the cartoon video and sound effects. In addition, a face (certainly, may alternatively be another part) of the child may be combined with an image template, and a combined image is presented on the second screen unit. The image template may present an animated character image. For example, a body image template of the princess Elsa in Frozen is combined with the face of the child, and a combined image is presented on the second screen unit, to attract attention of the child.

Alternatively, the face of the child may be processed to obtain an animated face, and the animated face is presented on the second screen unit.

Alternatively, the face of the child may be processed with a special effect of a distorting mirror, and a processed image is presented on the second screen unit, to attract attention of the child, and stimulate the child to laugh. The special effect of the distorting mirror may be implemented by compressing, expanding, or rotating different areas of a face, or may be implemented by using a special effect lens.

In a specific application scenario 3, instruct a photographing posture.

In this specific application scenario, when determining that the person in the viewfinder window directly faces the lens (or an eye stares at the lens) and determining a gender of the person, the terminal device plays, on the second screen unit that faces the person, a photographing pose guide image associated with the gender, and the photographed target may pose a corresponding posture based on the photographing pose guide image.

For example, if the terminal device determines that a person in the viewfinder window directly faces the lens or an eye stares at the lens, and a person in the viewfinder window is a female, the second screen unit may present a photographing pose reference image of a female, and the photographed target may imitate a posture in the photographing pose image, to obtain a better photographing effect. Further, a body feature of the photographed target may be collected, for example, a height and obesity. A photographing posture suitable for the photographed target is analyzed by using big data, and a corresponding photographing pose reference image is displayed on the second screen unit.

In addition to photographing a non-specific person, a still specific application scenario of the photographing method provided in this embodiment may be photographing a specific person. For example, a photographer photographs a girlfriend of the photographer. In this specific application scenario, whether a photographed target directly faces a lens or directly stares at the lens needs to be determined, and facial recognition further needs to be performed on the photographed target. Facial recognition and detecting whether the photographed target directly faces the lens (or directly stares at the lens) may be performed concurrently, or may be combined for performing. There are a plurality of facial recognition algorithms, such as a recognition algorithm based on a geometric feature, an LBP facial recognition algorithm, and an eigenface (Eigenface).

Figure 7:
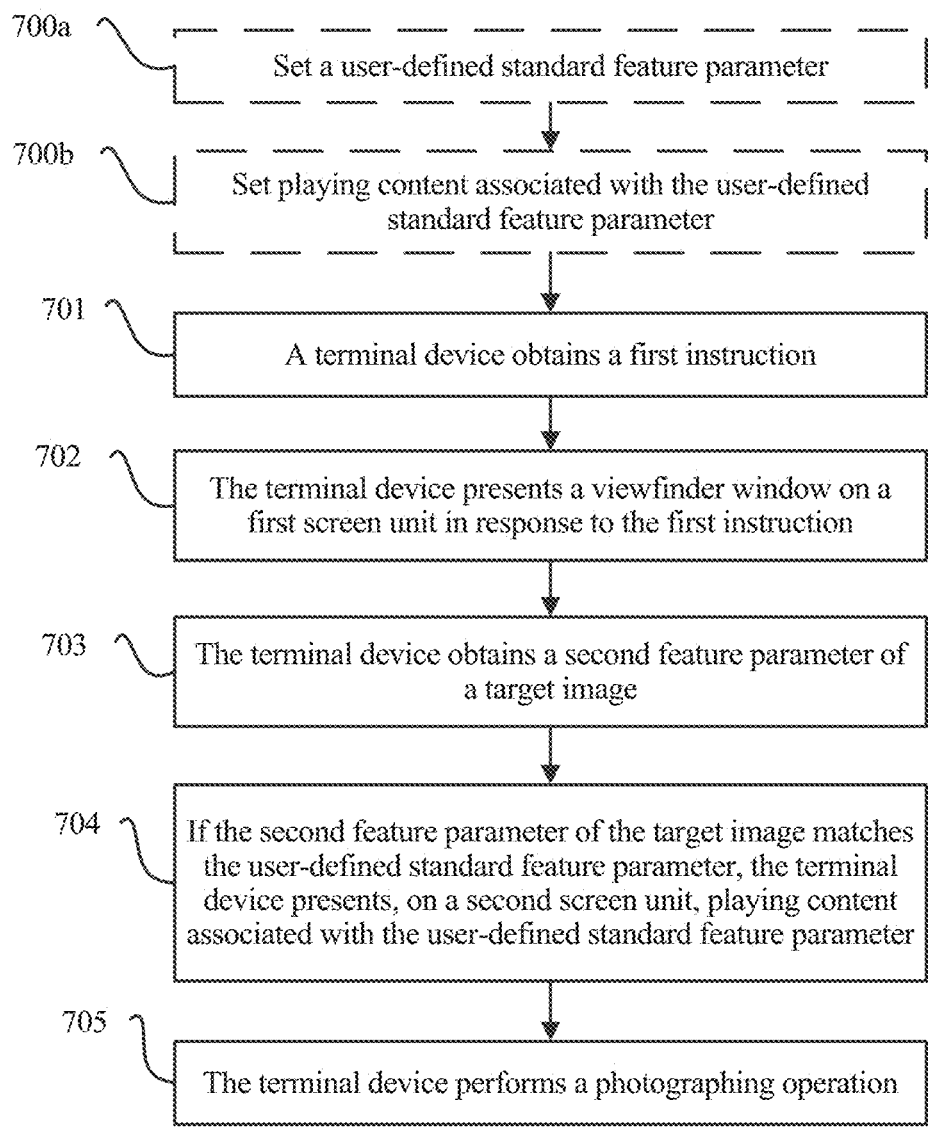
FIG. 7 is a schematic flowchart of a photographing method according to an embodiment of this application.

FIG. 7 shows still another schematic process of the foregoing photographing method. The method includes the following steps.

Steps 701 and 702 are respectively the same as steps 601 and 702 in the foregoing embodiment shown in FIG. 6 or steps 501 and 502 in the embodiment shown in FIG. 5. Details are not described herein again.

703. A terminal device obtains a second feature parameter of a target image.

In an example, if the above mentioned recognition algorithm based on a geometric feature is used to perform specific front face detection, the second feature parameter may include, for example, a location of an important feature point such as an eye, a mouth, and a nose of a photographed target in the target image, and a geometric shape of an important organ such as an eye is used as a classification feature.

In another example, if the above mentioned LBP facial recognition algorithm is used to perform specific front face detection, the second feature parameter includes, for example, an LBP feature extracted from the target image.

704. If the second feature parameter of the target image matches a user-defined standard feature parameter, the terminal device presents, on a second screen unit, playing content associated with the user-defined standard feature parameter.

In other words, the above mentioned standard feature parameter may include the user-defined standard feature parameter.

In an embodiment of this application, before a viewfinder window is presented, or before the second feature parameter of the target image is obtained, step 700*a*: set the user-defined standard feature parameter may be further included.

In an example, a specific manner of setting the user-defined standard feature parameter may include: extracting a second feature parameter of a specified image, and using the second feature parameter as the user-defined standard feature parameter. For example, the user may specify a series of pre-photographed images (more than or equal to one) of a same person or animal through tapping, a touch and hold operation, circling, and the like, and the terminal device extracts a second feature parameter from the specified series of images, and uses the extracted second feature parameter as the user-defined standard feature parameter. Alternatively, the terminal device may automatically extract the user-defined standard feature parameter. For example, an implementation may include: extracting, by the terminal device, a second feature parameter of each image (including each image in a cloud album) in a local album. Because different persons have different second feature parameters, the persons in the image may be distinguished based on the second feature parameters. For description of the second feature parameter, refer to step 703. Details are not described herein again.

In addition, referring to FIG. 5, before the viewfinder window is presented on a first screen unit, step 700*b*: set the playing content associated with the user-defined standard feature parameter may be further included.

For example, a person A and a person B have different second feature parameters, and the person A and the person B may be distinguished based on the extracted second feature parameters. If images having a same second feature parameter are classified into one type, it may be implemented that images are classified based on persons. Therefore, the playing content corresponding to the user-defined standard parameter may be set.

Optionally, the terminal device may determine a degree of intimacy between each recognized person and a user of the terminal device, and set corresponding playing content based on the degree of intimacy, for example, playing an intimate and warm video for an intimate person, and playing an ordinary funny video for a common person. There are a plurality of manners of recognizing a degree of intimacy.

For example, usually, a photographer tends to photograph an intimate person, for example, photographing a child, and photographing a wife/husband. Therefore, a quantity of images of an intimate person is usually greater than a quantity of images of an alienated person. Therefore, the degree of intimacy may be determined based on a quantity of images corresponding to each person.

For another example, second feature parameters of profile pictures of contacts in a contact list of the terminal device may be extracted, and the second feature parameters are compared with a second feature parameter extracted from the album. It is assumed that a second feature parameter of the person A in the album matches a second feature parameter of a contact, and a second feature parameter of the person B does not match the second feature parameters of all the contacts. A degree of intimacy of the person A is higher than a degree of intimacy of the person B.

In addition, the degree of intimacy between a person in the album and the user may be further determined based on contact frequency (for example, a call time, call frequency, and a video time) and the like.

After the degree of intimacy is recognized, second feature parameters of N persons with a highest degree of intimacy may be used as the user-defined standard feature parameter.

In addition, the terminal device may further obtain a personal preference through analysis by using big data, and automatically set associated playing content for the N persons with the highest degree of intimacy.

Because steps 700*a* and 700*b* are not performed each time during photographing, a dashed-line box is used. For description and setting of the playing content, refer to the description in the foregoing embodiments. Details are not described herein again.

It should be noted that there may be a plurality of groups of user-defined standard feature parameters, to recognize a plurality of different persons or objects. User-defined standard feature parameters in different groups may be associated with different or same playing content. In addition, a group of user-defined standard feature parameters may be associated with a plurality of playing content, and the plurality of playing content may be played randomly or sequentially when being played.

705. The terminal device performs a photographing operation.

Step 705 is similar to step 605 in the foregoing embodiment shown in FIG. 6 or step 505 in the embodiment shown in FIG. 5. Details are not described herein again.

The photographing technical solution provided in this embodiment may be applied to, for example, the following specific application scenario: photographing a specific person or object, for example, photographing lovers. A boyfriend may specify a plurality of images of a girlfriend in the terminal device, and the terminal device extracts a feature parameter from the plurality of specified images, and uses the feature parameter as the user-defined standard feature parameter. The plurality of images is specified to improve accuracy. Then, the boyfriend may set, as the playing content associated with the user-defined standard feature parameter, one or more videos that the girlfriend likes or text content edited by the boyfriend. For example, the text content may be as follows: "open a mouth wide to smile", "bad photographing is not a model problem", and the like. In this way, when photographing the girlfriend, once the terminal device recognizes that the girlfriend directly faces the lens or directly stares at the lens, the terminal device randomly and automatically plays various set content that makes the girlfriend happy, to snap an excellent moment of the girlfriend.

In this embodiment, flexible and diversified settings are provided. For example, the user may set personalized presenting content for a specific photographed target, or the terminal device may set different presenting content based on an analyzed degree of intimacy between a photographed target and the user. Therefore, corresponding content is presented when feature parameter matching is performed, an application scenario of the solution is expanded, and photographing efficiency is improved.

Figure 9:
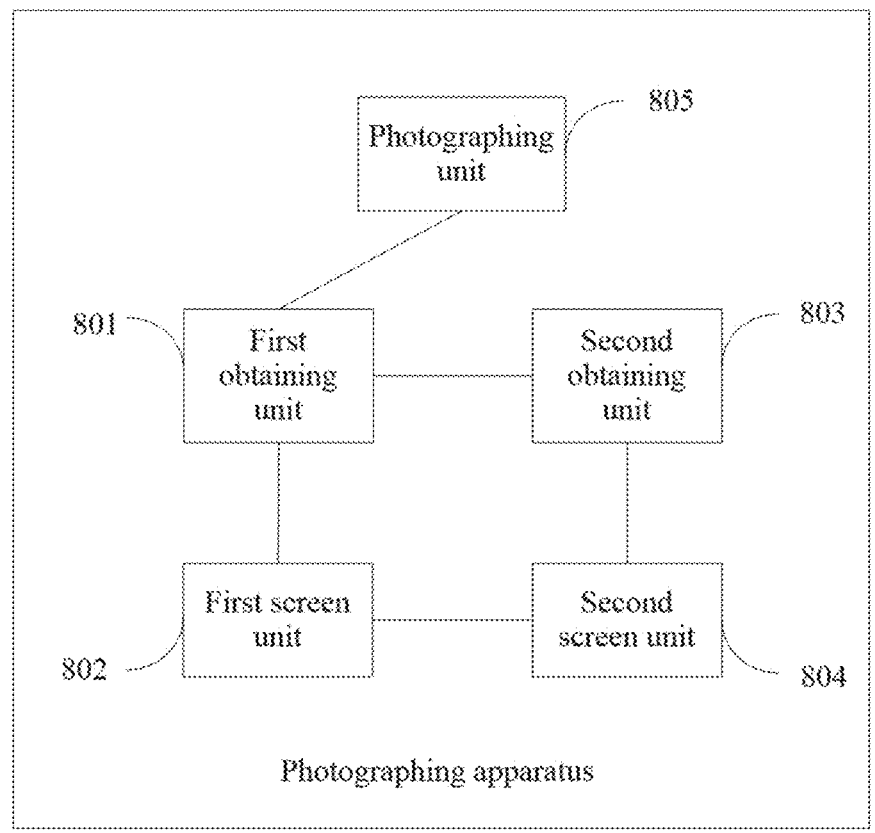
FIG. 9 is a schematic structural diagram of a photographing apparatus according to an embodiment of this application.

FIG. 9 shows an example of a structure of a photographing apparatus for implementing the foregoing method. The photographing apparatus may be configured to perform any one of methods shown in FIG. 5 to FIG. 7. For same or corresponding technical features of the photographing apparatus, descriptions may be mutually referred to. For related description, refer to the foregoing description in this specification. Details are not described herein again. The photographing apparatus may include at least: a first obtaining unit 801, configured to obtain a first instruction, where the first instruction is used to trigger a photographing function of the terminal device; a first screen unit 802, configured to present a viewfinder window in response to the first instruction; a second obtaining unit 803, configured to obtain a feature parameter of a target image, where the target image is an image presented in the viewfinder window of the first screen unit 802; a second screen unit 803, configured to: if the feature parameter of the target image matches a standard feature parameter, present preset playing content; and a photographing unit 805, configured to perform a photographing operation. The standard feature parameter includes a user-defined standard feature parameter. The feature parameter of the target image includes a first feature parameter. That the feature parameter of the target image matches a standard feature parameter includes that the first feature parameter of the target image matches the user-defined standard feature parameter. The playing content includes at least one of a text, an image, audio, and a video. In this embodiment, a photographed target can be stimulated in a short time to show a vivid expression, and a photographer can snap an excellent moment without waiting for a long time, to improve photographing efficiency and improve user experience of the photographer and the photographed target.

In an embodiment of the present invention, the photographing apparatus shown in FIG. 9 may further include a first setting unit and a second setting unit. The first setting unit is configured to set the user-defined standard feature parameter, and the second setting unit is configured to set playing content associated with the user-defined standard feature parameter. The second screen unit is specifically configured to present the playing content associated with the user-defined standard feature parameter. Specifically, the first setting unit sets the user-defined standard feature parameter in at least one of the following manners: extracting a feature parameter of a specified image in an album, and using the feature parameter as the user-defined standard feature parameter; extracting a feature parameter of at least one contact profile picture of a specified contact, and using the feature parameter as the user-defined standard feature parameter; and obtaining an instruction for entering at least one feature parameter by a user, and determining a corresponding feature parameter.

In the foregoing embodiment of the present invention, when performing the photographing operation, the photographing unit may obtain an instruction entered by the user, and perform the photographing operation based on the instruction entered by the user. Alternatively, the photographing unit may automatically perform the photographing operation after the preset playing content is presented on the second screen unit for a preset time.

In the foregoing embodiment of the present invention, the text in the playing content uses a first language. The photographing apparatus shown in FIG. 9 may further include a processing unit. The processing unit is configured to: determine a second language associated with a current geographic location; and if the second language is inconsistent with the first language, translate the text in the playing content into a text using the second language. The second screen unit is specifically configured to present playing content that uses the second language.

In the foregoing embodiment of the present invention, the photographing apparatus includes a plurality of camera lenses. The first screen unit is specifically configured to: present a plurality of viewfinder windows on the first screen unit, where different viewfinder windows present images captured by different camera lenses; or present one viewfinder window on the first screen unit, where an image presented in the viewfinder window is a composite image of images captured by different camera lenses.

In the foregoing embodiment of the present invention, the first screen unit and the second screen unit are respectively located on two sides of the photographing apparatus, or the first screen unit and the second screen unit are different areas of a same screen unit.

Figure 10:
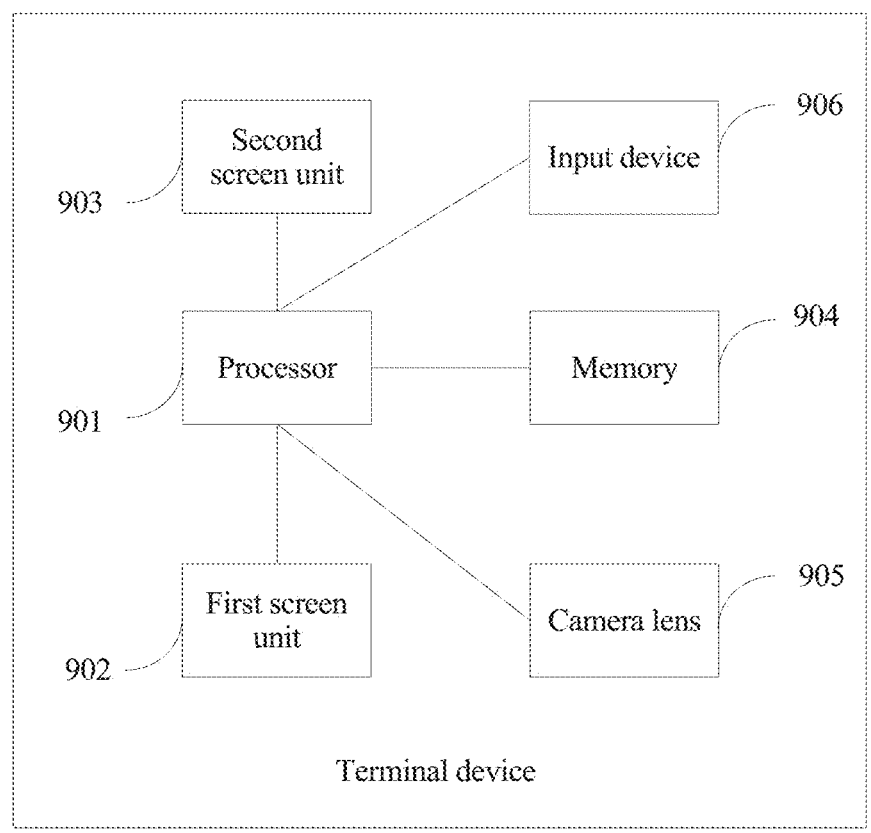
FIG. 10 is a schematic structural diagram of a terminal device according to an embodiment of this application.

FIG. 10 shows an example of a structure of a terminal device for implementing the foregoing method. The terminal device may be configured to perform any one of methods shown in FIG. 5 to FIG. 7. For related description, refer to the foregoing description in this specification. For same or corresponding technical features of the terminal device, descriptions may be mutually referred to. Details are not described herein again. The terminal device may include at least: a processor 901, a memory 904, a camera lens 905, an input device 906, a first screen unit 902, a second screen unit 903, and a bus. The processor 901, the memory 904, the camera lens 905, the input device 906, the first screen unit 902, and the second screen unit 903 are connected by using the bus. The memory 904 is configured to store an instruction. The input device 906 is configured to obtain a first instruction that is used to trigger a photographing function of the terminal device. The processor 901 is configured to present a viewfinder window on the first screen unit 902 in response to the first instruction. The processor 901 is further configured to: obtain a feature parameter of a target image, where the target image is an image presented in the viewfinder window; and if the feature parameter of the target image matches a standard feature parameter, present preset playing content on the second screen unit 903. The camera lens 905 is configured to perform a photographing operation. The standard feature parameter includes a user-defined standard feature parameter. The feature parameter of the target image includes a first feature parameter. That the feature parameter of the target image matches a standard feature parameter includes that the first feature parameter of the target image matches the user-defined standard feature parameter. The playing content includes at least one of a text, an image, audio, and a video. In this embodiment, a photographed target can be stimulated in a short time to show a vivid expression, and a photographer can snap an excellent moment without waiting for a long time, to improve photographing efficiency and improve user experience of the photographer and the photographed target.

In an embodiment of the terminal device in the present invention, the processor is further configured to: set the user-defined standard feature parameter, and set playing content associated with the user-defined standard feature parameter. The second screen unit is specifically configured to present the playing content associated with the user-defined standard feature parameter. Specifically, the processor sets the user-defined standard feature parameter in at least one of the following manners: extracting a feature parameter of a specified image in an album, and using the feature parameter as the user-defined standard feature parameter; extracting a feature parameter of at least one contact profile picture of a specified contact, and using the feature parameter as the user-defined standard feature parameter; and obtaining an instruction for entering at least one feature parameter by a user, and determining a corresponding feature parameter.

In an embodiment of the terminal device in the present invention, that the camera lens performs a photographing operation includes: responding to a second instruction that is obtained by the input device and this is entered by the user, and performing the photographing operation; or automatically performing the photographing operation after the preset playing content is presented on the second screen unit for a preset time.

In an embodiment of the terminal device in the present invention, the text in the playing content uses a first language. The processor is further configured to: determine a second language associated with a current geographic location; and if the second language is inconsistent with the first language, translate the text in the playing content into a text using the second language. The second screen unit is specifically configured to present playing content that uses the second language.

In an embodiment of the terminal device in the present invention, the terminal device includes a plurality of camera lenses. The first screen unit is specifically configured to: present a plurality of viewfinder windows, where different viewfinder windows present images captured by different camera lenses; or present one viewfinder window on the first screen unit, where an image presented in the viewfinder window is a composite image of images captured by different camera lenses.

In an embodiment of the terminal device in the present invention, the first screen unit and the second screen unit are respectively a first display screen and a second display screen on two sides of the terminal device; or the first screen unit and the second screen unit are different areas of a same bendable display screen.

An embodiment of the present invention further provides a computer readable storage medium. The computer readable storage medium stores an instruction. When the instruction is run on the photographing apparatus shown in FIG. 9 or the terminal device shown in FIG. 1 or FIG. 10, the photographing apparatus or the terminal device performs the photographing method in the method embodiments shown in FIG. 5 to FIG. 7.

An embodiment of the present invention provides a computer program product including an instruction. When the computer program product is run on the photographing apparatus shown in FIG. 9 or the terminal device shown in FIG. 1 or FIG. 10, the photographing apparatus or the terminal device performs the photographing method in the method embodiments shown in FIG. 5 to FIG. 7.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device such as a server or a data center into which one or more usable media are integrated. The usable medium may be a magnetic medium (for example, a floppy disk, a hard disk, or a magnetic tape), an optical medium (for example, a DVD), a semiconductor medium (for example, a solid state disk (Solid State Disk, SSD), or the like.

The objectives, technical solutions, and benefits of this application are further described in detail in the foregoing specific embodiments. It should be understood that the foregoing descriptions are merely specific embodiments of this application, but are not intended to limit the protection scope of this application. Any modification or improvement made based on the technical solutions of this application shall fall within the protection scope of this application.

What is claimed is:

1. A photographing method, wherein the photographing method is applied to a terminal device comprising a first screen and a second screen, and wherein the photographing method comprises:
   obtaining a first instruction, wherein the first instruction triggers a photographing function of the terminal device;
   presenting a viewfinder window on the first screen in response to the first instruction;
   obtaining a feature parameter of a target image, wherein the target image is an image presented in the viewfinder window;
   presenting preset playing content on the second screen in response to the feature parameter of the target image matching a standard feature parameter; and
   performing a photographing operation.

2. The photographing method of claim 1, wherein the standard feature parameter comprises a user-defined standard feature parameter, wherein the feature parameter of the target image comprises a first feature parameter, and wherein the feature parameter of the target image matches the standard feature parameter when the first feature parameter of the target image matches the user-defined standard feature parameter.

3. The photographing method of claim 2, further comprising:
   setting the user-defined standard feature parameter; and
   setting playing content associated with the user-defined standard feature parameter,
   wherein presenting the preset playing content on the second screen comprises presenting, on the second screen, the playing content associated with the user-defined standard feature parameter.

4. The photographing method of claim 3, wherein setting the user-defined standard feature parameter comprises at least one of;
   extracting a feature parameter of a specified image in an album, and setting the feature parameter of the specified image in the album as the user-defined standard feature parameter;
   extracting a feature parameter of at least one contact profile picture of a specified contact, and setting the feature parameter of the at least one contact profile picture of the specified contact as the user-defined standard feature parameter; or
   obtaining an instruction for entering at least one feature parameter by a user, and determining a corresponding feature parameter.

5. The photographing method of claim 1, wherein performing the photographing operation comprises:
   obtaining a second instruction from a user, responding to the second instruction from the user, and performing the photographing operation; or automatically performing the photographing operation after the preset playing content is presented on the second screen for a preset time.

6. The photographing method of claim 1, wherein the preset playing content comprises at least one of a text, an image, audio, or a video.

7. The photographing method of claim 6, wherein the text in the preset playing content uses a first language, and wherein presenting the preset playing content on the second screen comprises:
   determining a second language associated with a current geographic location;
   translating the text in the preset playing content into new text using the second language in response to the second language being inconsistent with the first language; and
   presenting, on the second screen, preset playing content that uses the second language.

8. The photographing method of claim 1, wherein the terminal device further comprises a plurality of camera lenses, and wherein presenting the viewfinder window on the first screen comprises:
   presenting a plurality of viewfinder windows on the first screen, wherein different viewfinder windows present images captured by different camera lenses; or
   presenting one viewfinder window on the first screen, wherein an image presented in the one viewfinder window is a composite image of images captured by the different camera lenses.

9. A terminal device, comprising:
   a bus;
   a first screen coupled to the bus;
   a second screen coupled to the bus;
   a memory coupled to the bus and configured to store an instruction,
   an input device coupled to the bus and configured to obtain a first instruction, wherein the first instruction triggers a photographing function of the terminal device;
   a processor coupled to the bus and configured to:
      present a viewfinder window on the first screen in response to the first instruction;
      obtain a feature parameter of a target image, wherein the target image is an image presented in the viewfinder window; and
      present preset playing content on the second screen in response to the feature parameter of the target image matching a standard feature parameter; and
   a camera lens coupled to the bus and configured to perform a photographing operation.

10. The terminal device of claim 9, wherein the standard feature parameter comprises a user-defined standard feature parameter, wherein the feature parameter of the target image comprises a first feature parameter, and wherein the feature parameter of the target image matches the standard feature parameter when the first feature parameter of the target image matches the user-defined standard feature parameter.

11. The terminal device of claim 10, wherein the processor is further configured to:

set the user-defined standard feature parameter; and
set playing content associated with the user-defined standard feature parameter,
wherein the second screen is configured to present the playing content associated with the user-defined standard feature parameter.

12. The terminal device of claim 11, wherein the processor is further configured to set the user-defined standard feature parameter in at least one of:
   extracting a feature parameter of a specified image in an album, and setting the feature parameter of the specified image in the album as the user-defined standard feature parameter;
   extracting a feature parameter of at least one contact profile picture of a specified contact, and the feature parameter of the at least one contact profile picture of the specified contact as the user-defined standard feature parameter; or
   obtaining an instruction for entering at least one feature parameter by a user, and determining a corresponding feature parameter.

13. The terminal device of claim 9, wherein when performing the photographing operation, the camera lens is further configured to:
   respond to a second instruction from a user, and perform the photographing operation; or
   automatically perform the photographing operation after the preset playing content is presented on the second screen for a preset time.

14. The terminal device of claim 9, wherein the preset playing content comprises at least one of a text, an image, audio, or a video.

15. The terminal device of claim 14, wherein the text in the preset playing content uses a first language, wherein the processor is further configured to:
   determine a second language associated with a current geographic location; and
   translate the text in the preset playing content into new text using the second language in response to the second language being inconsistent with the first language, and
   wherein the second screen is configured to present preset playing content that uses the second language.

16. The terminal device of claim 9, wherein the terminal device further comprises a plurality of camera lenses, and wherein the first screen is configured to:
   present a plurality of viewfinder windows, wherein different viewfinder windows present images captured by different camera lenses; or
   present one viewfinder window, wherein an image presented in the one viewfinder window is a composite image of images captured by the different camera lenses.

17. The terminal device of claim 9, wherein the first screen and the second screen are:
   a first display screen and a second display screen on two sides of the terminal device; or
   different areas of a same bendable display screen.

* * * * *